Figure 1:
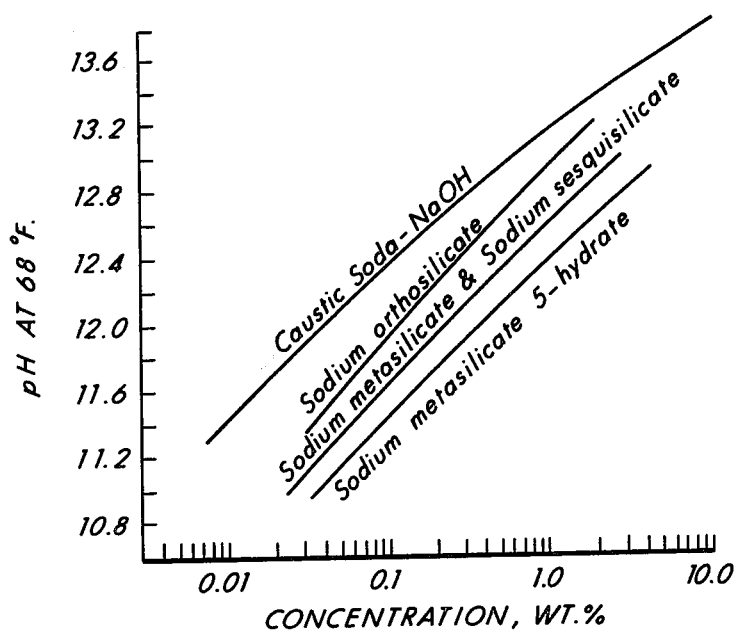

United States Patent
Sarem

[11] 3,876,002
[45] Apr. 8, 1975

[54] WATERFLOODING PROCESS

[75] Inventor: Amir M. Sarem, Yorba Linda, Calif.

[73] Assignee: Union Oil Company of California, Los Angeles, Calif.

[22] Filed: Apr. 1, 1974

[21] Appl. No.: 457,080

[52] U.S. Cl. ............................................... 166/274
[51] Int. Cl. ............................................. E21b 43/22
[58] Field of Search .......... 166/274, 275, 273, 252, 166/305 R, 294; 252/8.55 D

[56] References Cited
UNITED STATES PATENTS

| | | | |
|---|---|---|---|
| 3,208,517 | 9/1965 | Binder, Jr. et al. | 166/274 |
| 3,291,214 | 12/1966 | Hower | 166/294 |
| 3,294,164 | 12/1966 | Hardy et al. | 166/274 |
| 3,376,925 | 4/1968 | Coppel | 166/274 |
| 3,396,790 | 8/1968 | Eaton | 166/273 X |
| 3,472,319 | 10/1969 | McAuliffe | 166/273 X |
| 3,592,267 | 7/1971 | Stainback et al. | 166/294 |
| 3,700,031 | 10/1972 | Germer et al. | 166/274 X |
| 3,805,893 | 4/1974 | Sarem | 166/273 X |

Primary Examiner—Stephen J. Novosad
Attorney, Agent, or Firm—Dean Sandford; Richard C. Hartman; Lannas S. Henderson

[57] ABSTRACT

A method for reducing the channeling of flood water through heterogeneous petroleum reservoirs in which a stable oil-in-water emulsion formed by emulsifying crude oil with alkaline alkali metal silicate is injected into the reservoir through one or more injection wells, and followed by the subsequent injection of flood water. The injection of emulsion can be repeated at intervals throughout the waterflooding operation.

13 Claims, 2 Drawing Figures

WATERFLOODING PROCESS

This invention relates to the recovery of oil from subterranean petroleum reservoirs by waterflooding, and more particularly to an improved waterflooding process for heterogeneous reservoirs.

Since only a portion of the oil contained in a petroleum reservoir can be recovered by primary methods, it has become conventional practice to employ various secondary and tertiary recovery techniques to produce additional quantities of oil not economically recoverable by primary methods. Of the various secondary and tertiary recovery methods available, one of the most widely practiced techniques is the displacement of oil from the reservoir with a driving fluid such as flood water injected for that purpose. Normally, in carrying out the flooding process, a series of input wells spaced apart from one or more producing wells are drilled into and opened to the oil-producing strata. The injection well locations with reference to the production wells are selected to afford a desired flood pattern, the selected pattern depending in part upon field conditions, the location of existing wells, and the operator's preference. Aqueous drive fluid, such as water, brine, or a viscous aqueous polymer solution, is forced into the input wells under pressure, and out into the surrounding oil-bearing strata towards the producing well or wells. While waterflooding has been rather widely practiced in recent years, it is not without considerable operating problems and economic limitations, particularly those associated with low oil recoveries in proportion to the amount of water injected. Various surfactant and solvent floods have been proposed as means for recovering additional quantities of oil over that recoverable by conventional waterflooding. However, these processes face serious operating problems when practiced in heterogeneous formations containing strata or channels having permeabilities substantially higher than the bulk of the formation.

One of the major problems encountered in a flooding operation is breakthrough of the flooding medium from the flood front to the producing well relatively early in the displacement process, and rapidly increasing producing water/oil ratios following the initial breakthrough. These difficulties result from the displacing medium channeling or fingering through the oil-bearing structure to the producing well, thus bypassing large zones of the oil-bearing strata. The reason for the channeling of the flooding medium to the producing wells and the resulting low oil recovery is due, in part, to the peculiar structure of the oil-bearing strata. Underground oil reservoirs, in most cases, consist of layers of sand or rock and, since no reservoir rock is perfectly uniform in composition and structure, the permeability will vary across the rock face or stratum. Also, fractures, cracks, vugs and other anomalies can promote channeling of the displacement fluid.

In the normal flooding operation, maximum oil recovery is obtained when the driven fluid builds up in a wide bank in front of the driving fluid which moves uniformly towards the producing well. To keep this bank of oil intact, and constantly moving towards the producing well, a substantially uniform permeability must exist throughout the strata. If this uniform permeability does not exist, or is not provided, the flooding fluid will seek the areas of high permeability, and channeling occurs with the consequent loss of some driving fluid energy and the appearance of excessive amounts of driving fluid in the producing wells. Moreover, as the more permeable strata are depleted, the driving fluid has a tendency to follow channels and further increase consumption of the flooding media to the point where the process becomes uneconomical. This maximum limit, in terms of recovered oil, can be as high as 100 barrels of driving fluid per barrel of oil. It is of course desirable to operate at much lower driving fluid to oil ratios, and preferably not more than 15, and normally a maximum of 5 to 10 barrels of driving fluid per barrel of recovered oil is considered an acceptable operating condition, particularly where the driving fluid is a low cost agent such as flood water.

While a uniform flood front with reduced fingering can be obtained in some formations with a drive fluid rendered more viscous by the addition of various water-soluble polymers, or other materials capable of imparting higher viscosity to the flood water, viscous waterflooding is often ineffective in formations having severe heterogeneity as the mobility of the flood water cannot be economically reduced sufficiently to prevent or substantially restrict channeling of the flooding medium. Also, smaller volumes of aqueous polymer solution are sometimes injected into a heterogeneous reservoir to divert subsequently injected flooding media into the less permeable strata. However, such treatments are often ineffective or only partially effective in highly stratified formations.

Where a heterogeneous formation is flooded, it is usually found that the flood water or other flooding medium introduced into the injection well will enter the various strata open to the well at different flow rates depending upon the permeability of the individual strata relative to the permeabilities of the other strata in the formation. A water injection well of this type is said to exhibit a nonuniform injection profile.

A number of different techniques for improving injection profiles have been proposed. U.S. Pat. No. 3,472,319 issued to C. D. McAuliffe discloses one technique for rendering the injection profile of a water injection well more uniform in which an oil-in-water emulsion is prepared by admixing a crude petroleum containing saponifiable constituents with caustic, and injecting this emulsion into a reservoir ahead of a waterflood. Theoretically, the emulsion will preferentially enter the more permeable strata and reduce the permeability of these strata, thereby obtaining a more uniform distribution of the subsequently injected flood water. However, the emulsions prepared by saponification of crude petroleum with caustic often are not of a quality that provide the desired degree of permeability reduction, and maintain this permeability reduction for an extended period of time during the subsequent water injection step. The patentee recognizes this deficiency and proposes the use of synthetic surfactants to obtain higher quality emulsions. Hence, need exists for an improved flooding process for use in heterogeneous formations that will minimize channeling of the flooding medium or bypassing of large areas of the formation, or for a method for improving the effectiveness of the conventional emulsion plugging process to obtain these goals.

Accordingly, a principal object of this invention is to provide an improved flooding process for recovering oil from heterogeneous petroleum reservoirs.

Another object of the invention is to provide an improved waterflooding process for recovering oil from reservoirs having strata of widely varying permeabilities.

Still another object of the invention is to provide a method for reducing channeling of flooding medium from an injection well to a producing well in a flooding process.

A further object of the invention is to provide a waterflooding process for recovering increased quantities of oil from heterogeneous petroleum reservoirs.

A still further object of the invention is to provide an improved selective plugging process for reducing the channeling of flooding medium from the injection wells to the producing wells of a reservoir subjected to a flooding operation.

Other objects and advantages of the invention will be apparent from the following description.

Briefly, this invention provides a process for reducing the channeling of flood water through heterogeneous petroleum reservoirs in which a stable oil-in-water emulsion formed by emulsifying crude oil with alkaline alkali metal silicate is injected into the reservoir through at least one injection well, and followed by the subsequent injection of flood water. Oil is recovered from one or more production wells spaced apart in the reservoir from the injection wells. The injection of emulsion can be repeated at intervals throughout the waterflooding operation.

Crude petroleum is known to contain varying amounts of saponifiable materials such as petroleum acids which react with alkaline materials to form soaps that reduce the interfacial tension between the crude petroleum and water. The petroleum acids found in any particular crude petroleum can include various carboxylic acids and phenolic acids. Saponification of these acids form surface active agents that reduce the interfacial tension between the crude petroleum and water. The amount of these saponifiable materials in a crude petroleum and their effect upon the surface active properties of the system can be characterized by the variation of the interfacial tension of the oil-water system as a function of pH. The interfacial tension of a typical crude petroleum-water system at low pH is usually about 20 to 40 dynes/cm. Those crude oils having significantly high contents of saponifiable materials are characterized by reduced interfacial tension at high pH. The method of this invention is particularly applicable to the recovery of crude petroleum that exhibits an interfacial tension with water at a high pH of 5 dynes/cm or less, and more particularly to crude petroleum that exhibits an interfacial tension of 2 dynes/cm or less, and preferably less than 1 dyne/cm.

While the method of this invention is particularly adapted for recovery of oil from heterogeneous reservoirs, as a practical matter, most petroleum reservoirs exhibit some heterogeneity and thus, the overall recovery efficiency of the displacement process is improved in most naturally occurring petroleum reservoirs by treatment with the process of this invention. By heterogeneity, it is meant that the reservoir is comprised of stratified layers of varying permeability, or that it contains fractures, cracks, fissures, streaks, vugs, or zones of varying permeability that cause an injected flooding medium to advance through the reservoir nonuniformly. Thus, the formations that are particularly amenable to treatment by the method of this invention are those formations that have strata or zones of different permeabilities, and particularly formations having strata varying more than about 50 millidarcies in permeability or which are otherwise structurally faulted to the extent that the injected flooding medium does not advance through the formation at a substantially uniform rate along the entire flood front, but which instead are susceptible to channeling of the flood water to the producing well.

Figure 2:
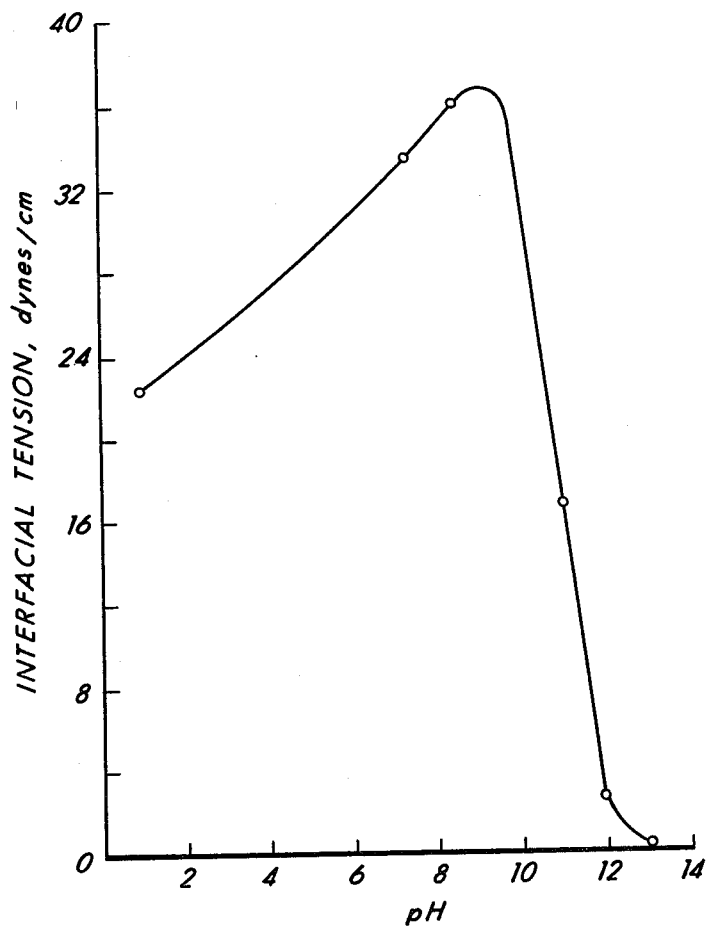

The invention is further described by reference to the appended drawings, wherein:

FIG. 1 is a graph illustrating the variation in the pH of aqueous solutions of various alkaline sodium silicates and sodium hydroxide as a function of the concentration of the alkaline material; and FIG. 2 is a graph illustrating the variation in the interfacial tension of a crude petroleum-water system with pH wherein the crude petroleum contains saponifiable petroleum acids.

The method of this invention is practiced by preparing a quantity of an oil-in-water emulsion. A suitable emulsion can be prepared by admixing a saponifiable crude petroleum with a dilute aqueous solution of an alkaline alkali metal silicate solution. Crude petroleum previously recovered from the reservoir to be treated can be employed, or saponifiable crude petroleum derived from other sources can be used. The emulsions formed in this manner exhibit high stability in that they do not readily separate into separate oil and water phases, and are not readily inverted to emulsions of the water-in-oil type.

The stability of an emulsion is indicated by the emulsion stability factor. The emulsion stability factor is measured by placing 50 ml of an oil, such as a crude petroleum to be tested, and 50 ml of an aqueous liquid in which it is to be emulsified in a 100 ml centrifuge tube. The centrifuge tube is shaken vigorously for 1 minute to thoroughly mix the liquid contents, and then maintained quiescent to permit the liquid phases to separate. The volume of separate liquid phase is observed at various time periods. The emulsion stability factor is defined as the time in minutes required to separate 20 ml of water phase.

It is desired that the emulsions employed in the practice of this invention exhibit high emulsion stability factors, with emulsions exhibiting emulsion stability factors above about 20 being preferred, and emulsions exhibiting emulsion stability factors above about 50 being even more preferred.

Suitable emulsions can be prepared by admixing the saponifiable crude petroleum with the alkaline alkali metal silicate solution in the proportions of about 0.3 to 3 volumes of crude petroleum per volume of alkaline alkali metal silicate solution, and preferably in the proportions of about 0.5 to 2 volumes of crude petroleum per volume of alkali metal silicate solution. The dilute alkaline alkali metal silicate solutions employed in the emulsification step are aqueous solutions containing about 0.1 to 0.8 weight percent of alkaline alkali metal silicate, and preferably about 0.05 to 0.3 weight percent of alkaline alkali metal silicate, in fresh water.

The alkaline alkali metal silicate used in the preparation of the emulsion is an alkali metal silicate having a molar ratio of $M_2O/SiO_2$ of 1 or above, wherein M is an alkali metal atom, such as sodium, potassium, lithium, cesium and rubidium, exemplary of which are alkali metal orthosilicate, alkali metal metasilicate, alkali metal metasilicate pentahydrate, and alkali metal sequisilicate. Particular agents useful in the practice of the invention include sodium and potassium orthosilicate, sodium and potassium metasilicate, sodium and potassium metasilicate pentahydrate, and sodium and potassium sequisilicate. The pH of aqueous solutions containing various concentrations of alkaline sodium silicates are shown in FIG. 1. These alkaline sodium silicates generally provide lower pH solutions than equal weight concentration solutions of sodium hydroxide, but nevertheless, provide high pH solutions useful in reducing the interfacial tension of many crude petroleum-water systems. Sodium orthosilicate is a particularly preferred alkaline alkali metal silicate because of its relatively high pH.

The alkaline alkali metal silicates used in the practice of this invention are available in solid form, and the respective alkaline alkali metal silicate solutions can be prepared by dissolving an appropriate quantity of the alkaline alkali metal silicate in water. However, in many cases it is more convenient and less costly to prepare the alkaline alkali metal silicate by adding caustic to an aqueous solution of a low-alkalinity alkali metal silicate having a $M_2O/SiO_2$ ratio of less than 1.

In practicing the invention, the variation in interfacial tension between the crude petroleum in the reservoir to be treated and water as a function of pH is first determined. If the interfacial tension is significantly lowered in alkaline systems, i.e., the interfacial tension can be lowered to less than about 5 dynes/cm, and preferably to less than about 2 dynes/cm, and most preferably to less than 1 dyne/cm by pH adjustment, the pH required to obtain the desired interfacial tension is determined. The concentration of alkaline alkali metal silicate required to provide this pH is determined from FIG. 1. Accordingly, it is within the scope of this invention to employ a concentration of alkaline alkali metal silicate effective to reduce the interfacial tension between the petroleum and water to less than about 5 dynes/cm, and preferably to less than about 2 dynes/cm, and most preferably to less than 1 dyne/cm. With most crude oils containing a significant quantity of saponifiable materials, interfacial tension reduction can be obtained by the addition of about 0.01 to 0.8 weight percent of alkaline alkali metal silicate, and often by about 0.05 to 0.03 weight percent.

The emulsion is injected into the reservoir through an injection well in communication therewith in an amount sufficient to cause the emulsion to penetrate into the more permeable strata of the reservoir a distance of about 20 to 50 feet from the injection well. While the amount of the emulsion penetrating individual strata will depend upon the permeabilities of the strata in communication with the injection well, usually sufficient penetration of the emulsion can be obtained by the injection of about 10 to 70 barrels of emulsion per vertical foot of formation open to the injection well.

The flooding operation conducted following the treating of this invention is practiced in conventional manner with conventional flooding agents. Accordingly, the flooding medium can be water, brine, or a dilute aqueous solution of a water-soluble polymer exhibiting a viscosity greater than that of the water or brine; the flooding medium being injected through one or more injection wells to displace oil towards one or more spaced production wells. Also, the flooding medium can comprise an alcohol, such as isopropyl alcohol, carbon dioxide, carbonated water, an aqueous or oil-base surfactant solution, an emulsion, a substantially anhydrous soluble oil, a water-in-oil microemulsion, a micellar dispersion, or the like, either injected as the entire flooding medium or in the form of a slug injection wherein one or more relatively small volumes of these agents are injected into the reservoir and followed by the injection of an aqueous drive fluid such as floodwater, brine, or aqueous polymer solution. A number of water-soluble polymers are known to decrease the mobility of water in porous media when dissolved therein in relatively dilute concentrations. Water-soluble polymeric materials that can be employed are relatively high molecular weight acrylic acid-acrylamide copolymers, acrylic acid-acrylamide-diacetone acrylamide terpolymers, partially hydrolyzed polyacrylamides, hydroxyethyl cellulose, carboxymethyl cellulose, polyacrylamides, polyoxyethylenes, modified starches, heteropolysaccharide obtained by the fermentation of starch derived sugar, polyvinyl alcohol, polyvinyl pyrollidone, and polystyrene sulfonates.

Also, it is sometimes advantageous, particularly, where the reservoir water is a brine, or brine is subsequently injected as the flooding medium, to precede the injection of the emulsion slug by the injection of a small volume of low salt-content fresh water, and to follow the emulsion slug with another small volume of fresh water to insulate or isolate the emulsion from contact with brine. In the usual application, an injection of 1 to 10 barrels of fresh water in each slug per vertical foot of interval to be treated is adequate, however the exact volume of water injected in this step is not usually critical.

Accordingly, in a preferred mode of practicing this invention, the formation characteristics and prior operations are studied to determine the extent of treatment required. Also, it is often desirable to conduct tracer studies to assist in this determination. Then a small slug of fresh water, usually amounting to between about 5 to 10 barrels per vertical foot of interval to be treated, is injected through the injection well and into the reservoir. Next there is injected through the injection well a sufficient amount of emulsion to penetrate into the most permeable strata a distance of at least about 20 feet from the injection well, and more preferably to a distance of about 50 feet from the injection well. A second small slug of about 5 to 10 barrels per vertical foot is injected. Thereafter, a flooding operation is conducted in conventional manner.

After treatment of a heterogeneous reservoir in accordance with the method of this invention and the subsequent injection of flooding medium, it is sometimes found at later stages of the flooding process that channeling of the flooding medium again becomes a problem. Also, occasionally, a single emulsion treatment may not control channeling to a desired degree. Thus, it is within the scope of this invention to repeat the aforedescribed treatment at spaced intervals to provide a plurality of plugging treatments. Subsequent treatments can be carried out by interrupting the injection of flooding medium and injecting an additional quantity of the above-described emulsion. Emulsion injection can be repeated at intervals throughout the flooding operation. The required frequency of emulsion injection can be ascertained by tracer tests to determine the travel times between injection and production wells.

7

This invention is further illustrated by the following examples which are illustrative of specific modes of practicing the invention as defined by the appended claims.

EXAMPLE 1

The stability of the emulsions used in the practice of this invention as compared with similar emulsions prepared by saponification with caustic soda is illustrated in this example. Dilute aqueous caustic soda and alkaline alkali metal silicate solutions which each exhibit a pH of 12.1 are prepared by adding sufficient sodium hydroxide or alkaline alkali metal silicate to distilled water to provide concentrations of 0.05 weight percent sodium hydroxide and 0.12 weight percent alkaline alkali metal silicate. The alkaline alkali metal silicate is prepared by admixing 0.958 parts by weight of a commercial low alkalinity sodium silicate solution containing 8.9 weight percent $Na_2O$ and 28.7 weight percent $SiO_2$ marketed by the Philadelphia Quartz Company under the trademark PQ Sodium Silicate N with 1.35 parts by weight of 50 weight percent sodium hydroxide solution.

The emulsions are prepared by admixing 50 ml of the dilute sodium hydroxide solution or alkaline alkali metal silicate solution and 50 ml of a crude petroleum to be tested in a 100 ml centrifuge tube. The resulting emulsion is allowed to stand quiescent and the quantity of separate aqueous phase measured periodically. A number of different saponifiable crude oils are tested in this manner and the results of these tests are reported in Table 1. The emulsion stability factor of each emulsion is determined.

8

EXAMPLE 3

The method of this invention is demonstrated by a laboratory flood of a reservoir model. The model consists of alternate thin layers of fine and coarse beads having different wettabilities and is designed to simulate the channeling characteristics of a heterogeneous reservoir. The ratio of the highest to the lowest permeabilities is estimated to be 50:1.

The model is saturated with a produced oil field brine. After saturation with the field brine, the model is desaturated with produced crude petroleum and water flooded with fresh water until a producing water/oil ratio above about 13/1 is reached. Oil recovery after the injection of about 1.7 pore volumes of flood water is about 53 percent of the oil initially in place.

Next, 0.2 pore volumes of an emulsion prepared by admixing equal parts of (1) a Texas crude petroleum of the type that exhibits reduced interfacial tension with water at high pH and (2) an aqueous 0.05 weight percent solution of sodium hydroxide exhibiting a pH of 12.1. This emulsion exhibits an emulsion stability factor of less than 1. After injection of the emulsion, flood water injection is resumed. Oil recovery is about 70 percent after a total fluid injection of 4 pore volumes.

This test is repeated using an emulsion prepared by admixing equal parts of the crude petroleum and an aqueous solution of sodium orthosilicate prepared substantially in accordance with the method described in Example 2 and diluted with water to obtain a 0.12

TABLE 1

| Elapsed Time, Minutes | EMULSION STABILITY TESTS AMOUNT OF SEPARATE WATER PHASE OBSERVED, ML | | | | | | | | | |
|---|---|---|---|---|---|---|---|---|---|---|
| | Crude A | | Crude B | | Crude C | | Crude D | | Crude E | |
| | NaOH | Silicate | NaOH | Silicate | NaOH | Silicate | NaOH | Silicate | NaOH | Silicate |
| 1 | 11 | 0 | 30 | 0 | 34 | 17 | 40 | 10 | 40 | 23 |
| 5 | 15 | 0 | 30 | 0 | 34 | 17 | 40 | 10 | 40 | 37 |
| 10 | 17 | 0 | 30 | 0 | 34 | 17 | 40 | 18 | 40 | 38 |
| 15 | 23 | 0 | 30 | 0 | 34 | 17 | 40 | 25 | 40 | 39 |
| 20 | 35 | 0 | 31 | 0 | 34 | 18 | 40 | 31 | 40 | 39 |
| 25 | 38 | 0 | 32 | 0 | 34 | 18 | 40 | 32 | 40 | 39 |
| 30 | 38 | 0 | 32 | 0 | 34 | 19 | 40 | 32.5 | 40 | 39 |
| 120 | 38.5 | 0 | 34 | 0 | 34 | 21 | 40 | 33 | 40 | 39 |
| ESF[1] | 12.5 | 120+ | <1 | 120+ | <1 | 75 | <1 | 11 | <1 | <1 |

[1] Emulsion stability factor.

While it is apparent from these data that the emulsion stability is dependent upon the particular crude oil forming the oil phase of the emulsion, in all cases more stable emulsions were obtained by emulsification with alkaline alkali metal silicate than by equivalent pH sodium hydroxide solutions.

EXAMPLE 2

An aqueous alkaline sodium orthosilicate solution is prepared by admixing 0.958 parts by weight of a commercial low alkalinity sodium silicate solution containing 8.9 weight percent $Na_2O$ and 28.7 weight percent $SiO_2$ ($Na_2O/SiO_2$ weight ratio of 0.31) marketed by the Philadelphia Quartz Company under the trademark PQ Sodium Silicate N, with 1.35 parts by weight of 50 weight percent sodium hydroxide solution. The resulting alkaline sodium orthosilicate solution is diluted with water to provide a dilute aqueous solution having the desired alkaline sodium orthosilicate concentration.

weight percent solution exhibiting a pH of 12.1. Approximately 51 percent of the oil initially in place is recovered by the first stage waterflood, with an ultimate oil recovery of 77 percent after a total fluid injection of 4 pore volumes.

These tests are summarized in Table 2.

TABLE 2

COMPARATIVE LABORATORY TESTS

| | Oil Recovery, % of OIP | |
|---|---|---|
| | Sodium Hydroxide Emulsion | Sodium Orthosilicate Emulsion |
| First Stage Waterflood | 53 | 51 |
| After cumulative injection of 4 pore volumes | 70 | 77 |
| Incremental oil recovery | 17 | 26 |

EXAMPLE 4

The method of this invention is demonstrated by the following example illustrating its practice in a heterogeneous oil-bearing reservoir having a vertical thickness of about 100 feet. The injection and production wells are arranged in conventional five-spot patterns, i.e., four injection wells are arranged around a single central production well.

The variation in the interfacial tension between the produced oil and injected water as a function of pH is determined, and this relationship is substantially as illustrated in FIG. 2. Reduction of the interfacial tension to a value of about 2 dynes/cm requires a pH of about 12.0. From FIG. 1 it is determined that a 0.12 weight percent solution of sodium orthosilicate is required to obtain this pH.

An emulsion is prepared by admixing equal volumes of the crude petroleum and the dilute sodium orthosilicate solution. The sodium orthosilicate solution is prepared substantially as described in Example 2. Approximately 1,116 barrels of this emulsion is injected into each of the injection wells and followed by the injection of flood water.

Various embodiments and modifications of this invention have been described in the foregoing description and examples, and further modifications will be apparent to those skilled in the art. Such modifications are included within the scope of this invention as defined by the following claims.

Having now described the invention, I claim:

1. A process for recovering petroleum from a subterranean reservoir penetrated by one or more injection wells and at least one production well spaced apart in the reservoir, which comprises injecting through at least one of said injection wells and into said reservoir an oil-in-water emulsion of (1) a crude petroleum of the type having reduced interfacial tension with water at high pH and (2) a dilute aqueous solution of alkaline alkali metal silicate having a molar ratio of $M_2O/SiO_2$ of 1 or above wherein M is an alkali metal atom; and thereafter injecting an aqueous flooding medium.

2. The method defined in claim 1 wherein said emulsion injected into said reservoir is characterized by an emulsion stability factor above about 20.

3. The method defined in claim 1 wherein said emulsion is comprised of about 0.3 to 3 volumes of said crude petroleum per volume of said alkaline alkali metal silicate solution.

4. The method defined in claim 1 wherein the concentration of said alkaline alkali metal silicate in said aqueous solution is adjusted to provide a pH sufficient to reduce the interfacial tension between said petroleum and water to less than about 5 dynes/cm.

5. The method defined in claim 1 wherein said alkaline alkali metal silicate is sodium or potassium orthosilicate, sodium or potassium meta silicate, sodium or potassium meta silicate pentahydrate, or sodium or potassium sesquisilicate.

6. A process for recovering petroleum from a subterranean reservoir penetrated by one or more injection wells and at least one production well spaced apart in the reservoir, which comprises:

preparing an oil-in-water emulsion having an emulsion stability factor above about 20 by admixing (1) crude petroleum of the type having reduced interfacial tension with water at high pH and (2) a dilute aqueous solution of an alkaline alkali metal silicate having a molar ratio of $M_2O/SiO_2$ of 1 or above wherein M is an alkali metal atom, said ingredients being in the proportion of about 0.3 to 3 volumes of crude petroleum per volume of said alkaline alkali metal silicate solution;

injecting through at least one of said injection wells and into said reservoir about 10 to 70 barrels of said emulsion per vertical foot of thickness of said reservoir;

thereafter injecting aqueous flooding medium; and recovering petroleum from said production wells.

7. The method defined in claim 6 wherein the concentration of said alkaline alkali metal silicate in said aqueous solution is adjusted to provide a pH sufficient to reduce the interfacial tension between said petroleum and water to less than about 5 dynes/cm.

8. The method defined in claim 6 wherein said alkaline alkali metal silicate is sodium or potassium orthosilicate, sodium or potassium meta silicate, sodium or potassium meta silicate pentahydrate, or sodium or potassium sesquisilicate.

9. The method defined in claim 6 including the steps of immediately preceding and following the injection of said emulsion by the injection of about 1 to 10 barrels per vertical foot of low salt-content water.

10. A process for recovering petroleum from a subterranean reservoir penetrated by one or more injection wells and at least one production well spaced apart in the reservoir, which comprises:

preparing an oil-in-water emulsion having an emulsion stability factor above about 20 by admixing (1) crude petroleum of the type having reduced interfacial tension with water at high pH and (2) an aqueous solution containing an amount of sodium orthosilicate between about 0.01 and 0.8 weight percent sufficient to reduce the interfacial tension between said crude petroleum and water to less than about 5 dynes/cm, said ingredients being in the proportion of about 0.3 to 3 volumes of said crude petroleum per volume of said sodium orthosilicate solution;

injecting through at least one of said injection wells and into said reservoir about 10 to 70 barrels of said emulsion per vertical foot of thickness of said reservoir;

thereafter injecting aqueous flooding medium; and recovering petroleum from said production wells.

11. A method for improving the injection profile of flooding medium injected into a heterogeneous subterranean formation having strata of varying permeabilities penetrated by an injection well wherein the flooding medium preferentially enters the more permeable of said strata, which comprises:

preparing an oil-in-water emulsion having an emulsion stability factor above about 20 by admixing (1) crude petroleum of the type having reduced interfacial tension with water at high pH and (2) a dilute aqueous solution of an alkaline alkali metal silicate having a molar ratio of $M_2O/SiO_2$ of 1 or above wherein M is an alkali metal atom, said ingredients being in the proportion of about 0.3 to 3 volumes of crude petroleum per volume of said alkaline alkali metal silicate solution;

injecting through said injection well and into said reservoir about 10 to 70 barrels of said emulsion per vertical foot of thickness of said reservoir; and thereafter injecting said aqueous flooding medium.

12. The method defined in claim 11 wherein the concentration of said alkaline alkali metal silicate in said aqueous solution is adjusted to provide a pH sufficient to reduce the interfacial tension between said petroleum and water to less than about 5 dynes/cm.

13. The method defined in claim 11 wherein said alkaline alkali metal silicate is sodium or potassium orthosilicate, sodium or potassium meta silicate, sodium or potassium meta silicate pentahydrate, or sodium or potassium sesquisilicate.

* * * * *